Figure 1:
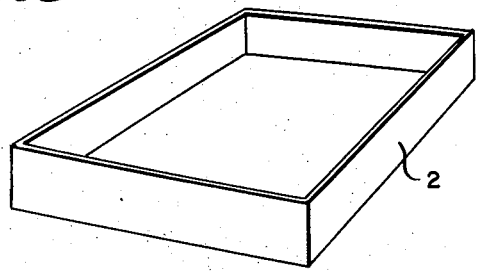

Aug. 11, 1964  W. C. RAINER ETAL  3,144,399
POLYETHYLENE PRODUCT
Filed June 16, 1958

INVENTORS
WILLIAM C. RAINER
EDWARD M. REDDING
ARTHUR W. SLOAN
WILLIAM D. STEWART
BY JOSEPH J. HITOV
Cushman, Darby & Cushman
ATTORNEYS

United States Patent Office 3,144,399
Patented Aug. 11, 1964

3,144,399
POLYETHYLENE PRODUCT
William C. Rainer, Barrington, R.I., Edward M. Redding, Winnetka, Ill., Joseph J. Hitov, Levittown, Pa., Arthur W. Sloan, Washington, D.C., and William D. Stewart, Alexandria, Va., assignors to W. R. Grace & Co., Cambridge, Mass., a corporation of Connecticut
Filed June 16, 1958, Ser. No. 742,236
11 Claims. (Cl. 204—154)

This application is a continuation-in-part of application Serial No. 516,236, filed June 17, 1955, now Patent No. 2,877,500.

The present invention relates to irradiated polyethylene and to methods of making polyethylene film and other articles with improved physical characteristics, notably improved shrink properties and/or increased clarity or transparency.

Polyethylene is widely used today in making containers, closures, squeeze bottles, toys, film packaging materials, etc. Despite its many advantages in these and other uses, it suffers from the disadvantage that it is normally translucent or opaque rather than transparent in appearance at room temperature and, hence, cannot be used in applications where a clear, water-white material is desired.

Furthermore, due to the fact that regular polyethylene does not have high shrink energy, it cannot be utilized satisfactorily in the form of heat-shrinkable bags.

It is known that solid polyethylene can be physically transformed into a clear, transparent viscous substance, when elevated to its transition point which is approximately 105° to 125° C. However, this transparency is normally lost upon cooling, unless special methods are employed and, even with such special methods, the transparency is not retained if the polymer is heated to its transition point and slowly cooled. The transition point of polyethylene is commonly referred to as its transparent or softening temperature. There also is some variation in transition point, depending on the average molecular weight of the polymer. With a molecular weight of about 20,000 the transition point is generally about 110° C.

Polyethylene, when heated to its transparent point, has a tensile strength which is nearly zero, for it is in a soft, plastic condition. In order to hot-stretch-orient polyethylene, stretching must commence while it is in the plastic state at approximately zero tension, which tension increases as cooling develops. This method will produce relatively clear films, but said films are somewhat frosty in appearance and have very limited commercial application.

It is an object of the present invention to produce a novel form of bilaterally oriented polyethylene.

Another object is to prepare polyethylene film or tubing having a strong biaxially shrinking force incorporated therein, i.e., polyethylene having high shrink energy.

A further object is to prepare polyethylene film having greatly increased tensile strength over conventional polyethylene film.

An additional object is to prepare irradiated polyethylene having improved shrink properties.

A still further object of the invention is to prepare polyethylene in film or sheet form, ranging in thickness from one mil or less, e.g., 0.3 mil, to at least 100 mils, which at room temperature is not only transparent, but clear, being preeminently crystal clear in the lower end of the range.

Another object of the present invention is to prepare a polyethylene which remains clear and transparent, e.g., water-white, regardless of change in physical form. For example, films of such clear and transparent polyethylene can be heated to at least its transition point, molded into desired shape and then recooled to form a new product which retains the clarity and transparency of the original film.

It is a further object of the invention to prepare a polyethylene which can be molded by conventional transfer and compression molding procedures to obtain a clear, water-white product.

Another object of the invention is to prepare a clear, water-white polyethylene of increased strength and toughness.

A further object is to prepare an irradiated polyethylene which is clear, transparent and free from gas bubbles.

Yet another object is to prepare a clear, stretched polyethylene which has high shrink energy but which also has selective resistance to excessive shrinkage upon heating.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained in a practical manner if the polyethylene is first conditioned by irradiation at a dosage of at least $2 \times 10^6$ rep., or more preferably at higher dosages such as $6 \times 10^6$ rep. or $10 \times 10^6$ rep. or $20 \times 10^6$ rep.

It is then heated to or beyond its transparent point, where it now performs as a rubbery solid, manifesting a tensile strength of greatly increased proportions. Advantage is taken of this property to stretch orient the irradiated polyethylene at this temperature, or above, but below the point where pronounced softening occurs, while it is fully transparent. After cooling to room temperature, while being maintained in the stretched condition, translucency no longer returns. The fullness of clarity of the polyethylene at its transition point is then maintained at room temperature.

The degree of stretching should be sufficient to impart a noticeable improvement in the clarity and/or the shrink energy of the polyethylene. For example, it can be heated and stretched 100%, 175%, 200%, 300%, or 500% or even 900% in some cases. Of course, the degree of stretch should be below the break limit of the polyethylene. For particularly outstanding results, the stretching is bilateral. In many instances, it is preferable to stretch in one direction, or better still in both directions, at least 250%. It is sometimes preferable to stretch-orient at temperatures beyond or above the transparent temperature of the polyethylene for best results as to clarity, although good results may be obtained at or near the clear point, for example, about 90° C. or above and even as low as 75° C. The transparent temperature may be approximately 100 to 125° C., depending on the molecular weight of the polymer and the irradiation dose administered. For the best shrink energy properties using conventional high pressure polyethylene, the stretch-orienting is usually carried out at a temperature not above about 127° C.

Orientation may be accomplished by uniaxial or, more preferably, biaxial stretching. By uniaxial orientation, the molecules are assembled in columns facing in the direction of stretch, e.g., lateral or longitudinal. Orienting biaxially moves the molecules into both a forward and a lateral arrangement.

When hot calendering is employed, the sample may be 1000 mils thick or even more, and can be calendered to an extent sufficient to reduce the thickness in half or less to develop clarity. The calendering can be done in one operation or the sample can be passed repeatedly through the calendering rolls in order to develop stretching to give the desired clarity and/or shrink energy. The sample should be hot, e.g., about 75° C. or above during the calendering or other stretching procedure, although it is not essential that the rolls be hot due to the fact that the sample will only be in contact with the rolls for a very short period of time and, hence, there will not be significant cooling of the sample by heat transfer. If the sample is stretched by repeated passage through the calendering rolls, care should be taken that the rolls are not so cold as to substantially reduce the temperature of the sample, or, if necessary, the sample can be reheated between the successive passages through the rolls, or the rolls themselves may be suitably heated, e.g., to 90° C., in order to maintain the necessary temperature of the sample. To predominantly bilaterally stretch the polyethylene film, it can be passed through the calendering rolls while the sample is hot, first in one direction and then passed through the rolls a second time and in a direction perpendicular to that of the first passing.

The hot stretching can also be accomplished for example, by pulling on the opposite ends of the sheet, e.g., at 100° C., or 105° C., or 110° C. Bilateral stretching can be obtained in this procedure if the sample is held between clamps on one set of opposite ends of the sheet, for example, a square sheet, and pulled first in one direction and then held between clamps on the second set of opposite ends of the sheet and pulled in a second direction perpendicular to the first direction of stretch.

It is very important to irradiate before stretching for best results. Thus, it has been found that, unless irradiation is carried out before stretching, it is not possible to maintain absolute clarity in thicknesses above 5 mils. Additionally, if irradiation is carried out after stretching, frosty transparency is maintained rather than the crystal transparency obtained when irradiation is carried out prior to stretching.

It is also possible, and frequently desirable, to further irradiate after the hot stretching in order to fix the clarity and other properties against subsequent change. This, likewise, increases the resistance to shrinkage which sometimes is advantageous. Such additional irradiation can be done at room temperature or any other temperature below the transition point. Preferably, this additional irradiation is carried out at a temperature below the point where shrinkage will occur in the absence of the additional irradiation, in order to impart the increased resistance to shrinkage or to prevent premature shrinkage in the event it is desired to retain shrinking properties.

The polyethylene can be irradiated at any convenient temperature below the transition point prior to stretching. Thus, in some instances, temperatures of 100° C., or even slightly above, can be employed, or there can be used temperatures as low as room temperature (about 20° C.), or even below, such as 0° C. for example. The lower temperature limit is that point at which free radicals cannot be formed in significant amounts from the polyethylene. Preferably, room temperature is used.

The polyethylene can be shaped, e.g., formed, into a rod or monofilament before, during or after irradiation. In fact, the polyethylene can be shaped or stretched, e.g., into a filament, as it comes from the extrusion die.

The following steps are employed in the preferred form of the invention.

(1) The heated polyethylene is cooled to a temperature sufficiently low to maintain its form through stages of mechanical handling, e.g., not over room temperature.

(2) The polyethylene is irradiated at a dosage of at least $2 \times 10^6$ rep.

(3) The irradiated polyethylene is heated at a temperature at which the polyethylene will soften sufficiently to stretch but also at a temperature at which the tubing of film will not break. These temperatures, as those skilled in the art realize, will vary to some extent depending upon the particular polyethylene used and the amount of irradiation employed. Then the polymer is bilaterally stretched to orient it at such elevated temperature.

(4) The stretched polymer is cooled under tension to a temperature at which the polymer will retain its form when the tension is released. Step (4) is necessary in order that the tension created by stretch-orienting may be released without premature shrinking of the polyethylene.

A rep., as is recognized in the art, is defined as that amount of nuclear radiation which dissipates 93 ergs of energy per gram of tissue producing $1.61 \times 10^{12}$ ion pairs in the process. It is approximately equal to the amount of energy that would be dissipated by a one roentgen X-ray beam in a gram of tissue.

The improvement in the properties of polyethylene prepared according to the present invention compared to a standard polyethylene is shown in the following table wherein in both cases the starting material was Alathon 14 (a high pressure, branched chain polyethylene having a density of 0.914, a melt index of 1.8 and an average molecular weight of about 20,000).

| Property | Irradiated, biaxially oriented Polyethylene | Standard Polyethylene |
| --- | --- | --- |
| Tensile strength, p.s.i. (22° C.). | 4,000 to 18,000 (usually above 5,000). | 1,350 to 2,500. |
| Percent shrinking at 96° C. | 19 to 55 | 0 to 25. |
| Shrink energy, p.s.i. (96° C.) | 100 to 500 | 0 to 10. |

Shrink energy is defined as the force of contraction at a given temperature when the material is restrained; more specifically, it is defined as the measurable tension produced in a fully mono-directionally restrained strip of film when heated to the specified temperature. Sometimes shrink energy is referred to as shrink tension.

It is this high shrink energy which permits the biaxially oriented polyethylene of the present invention to be used as a shrinking packaging material, e.g., in packaging turkeys and other fowl or in producing an "overwrap" food package. The product of the present invention will shrink uniformly about the product in contrast to the normal "overwrap" materials such as cellophane.

Surprisingly, the present oriented polyethylene has a greater flexing life than conventional polyethylene. It would be expected that the increased orientation due to stretching and the increased cross-linking due to irradiation would render the polyethylene film more brittle, but the contrary is the case.

It has also been observed that the oriented polyethylene film of the preferred form of the present invention will tear along any desired line much more readily than conventional polyethylene once an initial break is made in the film. This increases the ease in opening packages. Furthermore, it has been found that the increased tensile strength of the oriented polyethylene film of the present invention permits reduction in the thickness of the film used in wrapping.

For many applications in which advantage is taken of the high shrink energy of the biaxially oriented polyethylene it is stretched so that it will shrink at least 30% and up to 60% in each direction at 96° C., although larger or smaller shrinkage is convenient for some usages.

In the preferred form of the invention regular low density polyethylene is used. The polyethylene should be solid at room temperature and may have a molecular weight of 7000, 12,000, 19,000, 21,000, 24,000, 30,000, 35,000 or even higher. There can be employed either high pressure or low pressure polyethylene and either high, medium or low density polyethylene.

Irradiation can be accomplished by various methods. Thus, there can be used electrons, X-rays, gamma rays by employing iron 59 or cobalt 60, β-rays, for example, by employing cobalt 60, carbon 14, phosphorus 32 or strontium 90, or ultraviolet light above 2000 A. and below 2700 A., e.g., 2537 A. Preferably, electrons of at least $10^5$ electron volts energy are employed. The irradiation source can be a Van de Graaff type electron accelerator more fully described in Example I. This machine can be operated at 2,000,000 volts with a power output of 500 watts. Alternatively, there can be employed other sources of high energy electrons such as the General Electric 800,000 volt resonant transformer unit described by Lawton et al. in "Industrial and Engineering Chemistry," volume 46, pages 1703–1709, or the more powerful 1,000,000 and 2,000,000 volt Resonant Transformers of General Electric, or other conventional apparatus for producing beams of electrons, such as those recited, for example, in Brophy Patent No. 2,668,133, column 3, lines 5–29.

The time of irradiation, while not critical, as long as a dosage of sufficient rep. is attained, can vary between 0.75 second and 75 seconds, preferably between 7.5 seconds and 45 seconds, with the apparatus of Example I. The voltage can also vary quite widely and can be 750,000 or 1,000,000 or 2,000,000 or 3,000,000 or 6,000,000 volts, or even higher. Lower voltages, e.g., 500,000 or 100,000 or even lower, can likewise be employed. By appropriate combination of time of treatment and voltage, the desired rep. dosage can be obtained.

The irradiation of the polyethylene is usually carried out at a dosage between about 6 and 75 megarep. and is desirably between 8 and 20 megarep. with conventional solid high pressure polyethylene.

Irradiation according to the preferred form of the invention is generally carried out at any temperature up to that which will impair the mechanical stability of the polyethylene, for example, up to about 60° C. Room temperature is preferred for economic reasons. However, slightly higher efficiency is obtained at higher irradiation temperatures.

To obtain biaxially oriented irradiated polyethylene with high shrink energy utilizing regular low density polyethylene (density not over about 0.920), the irradiated material is usually heated to 90 to 105° C., although temperatures as low as 75° C. can be employed. The stretching can be 100 to 900% in a lateral direction as well as in a longitudinal direction compared with the initial polyethylene sheet or tubing prior to stretching.

After the bilateral stretching, the polyethylene is cooled under tension, either rapidly or slowly, resulting in the locking of the molecules in their new position. Generally, the cooling is done to room temperature. After cooling and release of tension, subsequent heating allows release of the shrink energy which tends to return the polyethylene to its original shape and size. In brief, the product has a controllable shrinkage.

Figure 2:
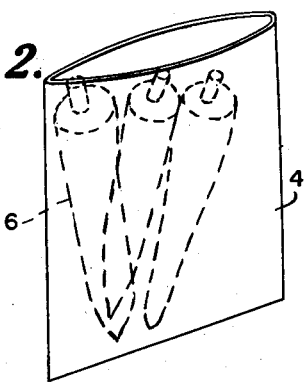
Figure 3:
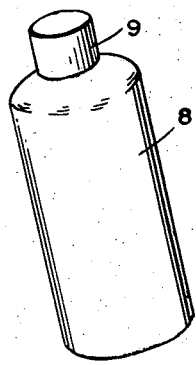
Figure 4:
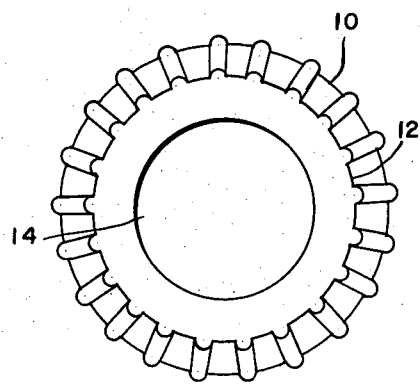
Figure 5:
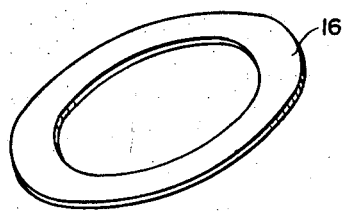

Typical uses for the new transparent polyethylene are disclosed in the drawings, wherein FIGURE 1 is a perspective view of a box;
FIGURE 2 is a perspective view of a flexible bag;
FIGURE 3 is a perspective view of a squeeze bottle;
FIGURE 4 is a bottom view of a crown cap, and
FIGURE 5 is a perspective view of a ring gasket.

Referring more specifically to the drawings, in FIGURE 1, there is shown a box 2, made of the transparent polyethylene of the present invention. The box can be used, for example, as a silverware container.

In FIGURE 2, there is shown a flexible bag 4 made of transparent polyethylene. Such bags are particularly desirable for displaying food products, designated generically at 6, in grocery stores, as the customer desires to see the product before buying. Thus, there can be packaged vegetables, such as carrots and lettuce, or meats, such as turkey, or candies or even ice cream.

The transparent polyethylene also can be used to replace the conventional translucent polyethylene in making a squeeze bottle 8 and cap 9 with enhanced esthetic values. Such bottles also can be used in place of tin cans or glass jars. If desired, although this is not ordinarily preferred, the transparent polyethylene can be tinted with oragnic dyestuffs to give colored bottles, and other products, which retain their transparent characteristics.

The transparent polyethylene also can be molded into cap liners, such as the liner 12 in crown cap 10. It is possible to provide such liners with a central recess, as shown at 14. In addition, the transparent polyethylene can be formed into a ring gasket 16, and advantage taken of the transparency, e.g., in building working models of machines, where it is desired to see the entire operation, cups, beakers, etc.

It is also possible to sterilize articles packaged in transparent polyethylene containers, such as the bag 4 and the bottle 8, by submitting the package to heat sterilization, e.g., a bottle, formed from polyethylene having a thickness of 45 mils, could have the articles therein sterilized by submitting the package to a temperature of 58 to 60° C. for 24 hours. Also, higher temperatures can be employed for shorter periods of time, e.g., 110° C. for 5 minutes on three consecutive days to kill spores.

The transparent polyethylene is especially desirable for use as liners with caps for wide mouthed containers, as the interior of the cap may be decorated and observed through the liner because of the transparency of the latter. The new polyethylene of the present invention can also be used in coatings and other coverings.

The transparent polyethylene can be formed into valuable products in any of the conventional ways employed with customary translucent polyethylene, such as by making sheets or blown films for packaging purposes, vacuum molding, pressure molding, or even by punching out or stamping articles, e.g., cap liners or ring gaskets, from blanks.

The transparent polyethylene of the present invention can be employed in many instances where clear vinyl resins or acrylates and methacrylates are now used. The new polyethylene is of particular advantage, due to its increased strength and resistance to elevated temperature.

Advantage can be taken of the high shrink energy in packaging turkey and other fowl, as well as other meat, to provide attractive packages which take the form of the article packaged.

The uses recited above are not exhaustive, but are illustrative only and in no way limit the invention.

EXAMPLE I

Polyethylene film, molecular weight about 20,000, having a thickness of 50 mils, was subjected to an electron beam at room temperature. The source of the electron beam was a Van de Graaff electrostatic generator, manufactured by the High-Voltage Engineering Corporation, Cambridge, Mass. This machine is a high voltage X-ray generator and was modified by removal of the tungsten target from the path of the electrons to permit thereby irradiation of the objects at the port. The generator was operated at two million volts with an amperage of 41 microamps at the target area per inch of scan.

The polyethylene film was then held between clamps, heated to about 110° C. until clear, and longitudinally stretched 800% to maintain the clarity, and maintained under tension with the aid of the clamps which were secured to the ends of the film. The film was kept under this tension to prevent shrinkage and loss of clarity while cooling slowly to room temperature.

It was observed that a stay under the electron beam of about 3.75 seconds was necessary in order to obtain a product which could be satisfactorily maintained under tension at 110° C. and it was found preferable to employ a stay of 7.5 seconds. With the instrument employed, a dosage of $2 \times 10^6$ rep. is given with each 0.75 second of treatment.

EXAMPLE II

A sheet of polyethylene of approximately 21,000 molecular weight, 35 mils thickness, was irradiated under the 2 mev. beam of Example I at $20 \times 10^6$ rep. at room temperature and was subsequently heated to and slightly beyond the point of clarity and, while in said condition, was stretched longitudinally 900% of its original length while held between clamps. Simultaneously, it contracted laterally to about ¼ its original width. After removing the source of heat, and while still under stretched tension, the sheet was cooled slowly to room temperature. An amazing phenomenon occurred. The sheet did not return to its former translucency and was not only transparent, but preeminently crystal clear. The resultant sheet, through the above process, was reduced to a thickness of 14 mils. After exposure to a temperature of 93° C. for 15 minutes, the finished sheet evidenced a total increase in thickness of approximately 5.9%; at 79° C., no change in dimensions was apparent.

EXAMPLE III

Alathon 10 (approximately 21,000 molecular weight) platens were made in a thickness of 35 to 40 mils. These were irradiated at room temperature to a dosage of about $20 \times 10^6$ rep. as in Example II, heated to the clear point (about 110° C.) and stretched manually in the longitudinal direction. The samples were allowed to cool to room temperature while still extended. All the samples were stretched between 400 and 500%. The samples were tested for various properties, including percent shrink, tensile strength, and shrink energy with the following results:

| Sample | Amount of Stretching | Percent Shrink 85° C. | Percent Shrink 96° C. |
| --- | --- | --- | --- |
| 1 | 500 | 6 |  |
| 2 | 406 | 16 |  |
| 3 | 406 | 15 |  |
| 4 | 500 | 8 |  |
| 5 | 490 |  | 25 |
| 6 | 457 |  | 29 |
| 7 | 476 |  | 31 |
| 8 | 489 |  | 26 |

| Sample | Tensile strength, p.s.i., 21° C. | Shrink energy, p.s.i., 96° C. |
| --- | --- | --- |
| 9 | 11,000 |  |
| 10 | 13,300 |  |
| 11 | 12,300 |  |
| 12 | 11,100 |  |
| 13 |  | 234 |
| 14 |  | 263 |
| 15 |  | 410 |

EXAMPLE IV

The clear film formed in Example II was given a further irradiation dosage of $50 \times 10^6$ rep. at room temperature without being maintained under tension. The film was then heated to 93° C. for 15 minutes without noticeable change in dimension and the crystal clarity was also retained upon subsequent slow cooling to room temperature.

EXAMPLE V

A polyethylene sheet, having a molecular weight of about 20,000 and a thickness of about 40 mils, was irradiated as in Example I until it had received a dosage of $20 \times 10^6$ rep. at room temperature. Clamps were secured to both pairs of opposite ends of the sheet and it was heated to the point of full clarity (about 110° C.). When full clarity had developed, it was stretched longitudinally 220% and then was stretched laterally 220% at the same temperature. The bilaterally stretched polyethylene film was then allowed to cool slowly to room temperature while under tension and then the clamps were released. The film was clear.

EXAMPLE VI

Polyethylene sheet, molecular weight about 21,000, having a thickness of 166 mils, which had been given an irradiation dosage of $20 \times 10^6$ rep. at room temperature, was heated to 120° C. which is beyond the point of clarity, and then passed six times through hot calendering rolls having a temperature of approximately 82° C. to stretch the polyethylene in a longitudinal and lateral direction simultaneously (biaxial orientation). The calendering rolls were set at varying clearances to reduce the polyethylene gradually to 85 mils. The clearances between the rolls were as follows:

|  | Inches |
| --- | --- |
| First setting | .060 |
| Second setting | .055 |
| Third setting | .050 |
| Fourth setting | .046 |
| Fifth setting | .043 |
| Sixth setting | .037 |

The hot stretched polyethylene sheet was then quenched to room temperature by being immersed in water. The resultant sheet was unusually clear. The change in physical dimensions of the sample was as follows:

|  | Sheet before calendering, mils. | Sheet after calendering, mils. | Percent change |
| --- | --- | --- | --- |
| Length | 34 | 50 | 47 |
| Width | 33 | 46 | 39 |
| Thickness | 166 | 85 | 48 |

By initiating calendering when the sheet is hot and clear, stretching of the polyethylene can be reduced below the 100% level to develop the desired clarity at room temperature. If, however, the sheet is not heated to the point of full clarity of the polyethylene, an increase in longitudinal stretch with an accompanying decrease in lateral stretch will occur, as is shown in the following example.

EXAMPLE VII

Another polyethylene sheet, of the same molecular weight and given the same irradiation treatment as in Example VI, was heated only to 93° C. and then passed six times through hot calendering rolls having a temperature of 82° C., as indicated above. The calendering rolls were set at the same varying clearances as described above. The change in physical dimensions of the sample was as follows:

|  | Sheet before calendering, mils. | Sheet after calendering, mils. | Percent change |
|---|---|---|---|
| Length | 33 | 78 | 136 |
| Width | 33.5 | 42 | 25 |
| Thickness | 163 | 58 | 64 |

The resultant sample was quite clear.

Instead of primarily uniaxially stretching the polyethylene by hot calendering, another sample of the polyethylene was biaxially stretched by this method by passing the film a first time through the rolls as above and a second time through the hot calendering rolls in a direction perpendicular to that of the first passage. Thus, the same polyethylene film as Example I which, however, had received an irradiation dosage of $28 \times 10^6$ rep. at room temperature, in the manner described in Example I, was heated to 93 C. and passed repeatedly through the hot calendering rolls at about 85° C. until stretched longitudinally 250% and then the film, at the same temperature, was passed through the hot rolls in a direction perpendicular to the previous one to obtain a 250% lateral stretch, and was then quenched to room temperature. The sheet was increased in length from 34 mm. to 119 mm. and in width from 28 to 98 mm. The resulting sheet was very clear.

The bilaterally stretched polyethylene could then be further irradiated, if desired, in the manner previously set forth, e.g., with a further dosage of $50 \times 10^6$ rep. at 25° C.

EXAMPLE VIII

A sample of polyethylene molecular weight 21,000 (Bakelite DYNH), having a thickness of about 166 to 171 mils, was irradiated with the apparatus of Example I at room temperature to give a dosage $52 \times 10^6$ rep. and was then heated to 120° C., at which temperature it was clear. This sample was then quenched to 25° C. by immersion in a large volume of water. A substantial amount of the clarity was retained. The sample was then heated to 93° C. and passed a single time through calendering rolls which were at room temperature. The polyethylene film was reduced in thickness to 119 to 122 mils (about 28%) and had an improved clarity. The sample was then allowed to cool to room temperature. Upon reheating of the sample to 79° C., there was noted a total increase in thickness of approximately 0.8%.

This example demonstrates the fact that, when quenching is employed to aid in the development of clarity, it is possible to reduce, by a considerable amount, the total stretching required to get optimum clarity.

Another sample of the same polyethylene as that employed in Example VIII was irradiated as in Example VIII, to give a dosage of $52 \times 10^6$ rep. This sample was heated to 93° C., and while at that temperature, calendered on the same rolls as in Example VIII, with the rolls being at room temperature. The percent stretch obtained was the same as in Example VIII. No significant increase in clarity was noted. When the sample was heated to 79° C., there was a total increase in thickness of approximately 5.9% in contrast to the increase of only 0.8% in Example VIII. From the above, it is evident that the addition of the quenching step materially reduced the tendency to revert to the condition of the sample prior to stretching.

In Example VIII, if hot calendering rolls, e.g., rolls maintained at 93° C., are substituted for the cold calendering rolls, there is no substantial change in dimensions of the sample in the 79° C. test. Normally, the slight amount of change in dimensions imparted by employing cold calendering rolls is not critical. However, where it is important to have absolutely no change in dimensions, it is advisable that the calendering rolls be maintained hot.

EXAMPLE IX

The process described in Example VIII was repeated with the same polyethylene, but having a thickness of 140 to 144 mils for the sample which was quenched and 137 to 138 mils for the sample which was not quenched, and the irradiation dosage was $40 \times 10^6$ rep. The quenched sample, after calendering, was reduced in thickness 32% and the unquenched sample was reduced in thickness 33%. In the 79° C. test, the quenched sample had an increase in thickness of 1.1% and the unquenched sample had an increase in thickness of 3.3%.

EXAMPLE X

The procedure of Example VIII was repeated, using a dosage of $28 \times 10^6$ rep. and there was included a third sample maintained at room temperature which was merely calendered at this temperature and was not heated to 93° C. The sample calendered at room temperature had a thickness of about 170 mils and was reduced in thickness about 37% by the calendering. The sample which was heated to 93° C. had a thickness of about 167 to 169 mils and was reduced in thickness about 32% by the calendering. The sample which was quenched and then heated to 93° C. had a thickness of 171 to 172 mils and was reduced in thickness about 37% by the calendering. In the 79° C. test, the sample which was merely calendered at room temperature, had a total increase in thickness of 37%. The sample which had been heated to 93° C. had an increase in thickness of 1.8%, and the sample which had been quenched before heating to 93° C. also had an increase in thickness of 1.8%.

From the results obtained in Examples VIII, IX and X, it can be seen that with increasing preliminary irradiation dosages, there is an increase in the tendency to return to the former dimensions with the samples that have been heated to 93° C., but have not been quenched. This is as would be expected. On the other hand, it will be noted that the samples which received the quenching treatment showed a reversed tendency to revert to the original dimensions, which is, indeed, surprising. In addition, the samples which received the quenching treatment also always had a desirable low tendency to revert to the former dimensions through the range of irradiation dosages tested.

As will be understood, shrinkage in a longitudinal or lateral direction, or both, of the polyethylene is normally accompanied by an increase in thickness so that the total volume occupied by the sheet remains substantially constant.

It has now been found that, if polyethylene is first subjected to a definite minimum irradiation dose below its transition point, where it does have adequate strength, and then heat-stretched in the manner set forth above, that crystal clear polyethylene can be prepared without the formation of blisters.

Relative to retaining clarity by further irradiation after stretching, at a dosage level of $20 \times 10^6$ rep., the increase in retention of transparency becomes evident to a significant amount. At $6 \times 10^6$ rep., the retention is pronounced. In ascending order of dosage, this retention of transparency is progressively enhanced, being quite good at $20 \times 10^6$ rep., until at $52 \times 10^6$ rep., a mere trace of translucency appears after subsequent heating to the transition point and slow cooling. At an even higher dosage, e.g., $76 \times 10^6$ rep., even this trace of translucency does not occur and the irradiated polyethylene retains all the water-white clarity of the treated product, despite subsequent heating to the transition point and slow cooling and/or reheating to shape or mold. It is advisable that the total amount of irradiation be kept below $200 \times 10^6$ rep. for, at this dosage, polyethylene assumes a permanent amber tint. Dosages below $100 \times 10^6$ rep. are normally preferred.

The present method of preparing clear irradiated polyethylene is superior to cold calendering in obtaining films (and other articles) which are resistant to unwanted change in thickness upon heating and in which shrinkage can be better controlled, as is shown in the following table. In the table, all of the samples were prepared from the same polyethylene, molecular weight about 20,000, reduced in thickness from about 155 mils to about 30 mils, in the case of the cold calendered sample and were given the indicated irradiation dosage at room temperature with the machine described in Example I. The hot stretched sample was prepared by pulling the polyethylene film from 35 mils to 14 mils thickness at its transition point and cooling to room temperature slowly.

In the table, the cold calendered samples were calendered at room temperature.

*Table*

COLD CALENDERED BEFORE IRRADIATION

| Dosage | Shrinkage after 15 min. in the oven at— | | | |
|---|---|---|---|---|
| | 66° C. | 79° C. | 93° C. | 107° C. |
| 0 _____percent__ | 9.3 | 35 | _____ | 168.0 |
| $20\times10^6$ rep_____do____ | 9.3 | 34.4 | _____ | 350.0 |
| $40\times10^6$ rep_____do____ | 1.9 | 14.8 | 41.2 | 241.0 |
| $52\times10^6$ rep_____do____ | 1.9 | 10.0 | 41.4 | 251.0 |
| $76\times10^6$ rep_____do____ | 0.0 | 6.7 | 26.7 | 191.0 |
| $100\times10^6$ rep_____do____ | 0.0 | 6.2 | 24.8 | 170.0 |
| $200\times10^6$ rep_____do____ | 0.0 | 0.0 | 14.3 | 62.9 |

HOT STRETCHED AFTER IRRADIATION

| | | | | |
|---|---|---|---|---|
| $20\times10^6$ rep_____percent__ | 0.0 | 0.0 | 5.9 | 44.1 |

From the above, it is clear that with a much smaller degree of irradiation, the hot stretched sample gave a more controlled shrinkage upon heating to elevated temperatures.

In other words, to obtain the same amount of shrinkage with a product hot stretched after irradiation as compared with a product cold stretched before irradiation, the irradiation dosages being the same, a higher temperature is required with the hot stretched product. This can be taken advantage of in connection with the high shrink energy of the biaxially oriented products in order to prepare packages which will shrink about the contents upon immersion in hot water or the application of hot air, etc.

The high shrink energy of the preferred biaxially oriented polyethylene is illustrated in Example XI.

EXAMPLE XI

Alathon 10 platens were made in a thickness of 35 mils and were irradiated at room temperature to a dosage of about $20\times10^6$ rep. and then biaxially stretched at the indicated temperatures while held between clamps. The results are shown in the following table.

*Table*

| Stretching Temperature | Thickness After Stretching | Tensile Strength | Percent Elongation | Percent Shrink at 96° C. | Shrink Tension at 96° C., p.s.i., three samples |
|---|---|---|---|---|---|
| 99° C _____ | 9.0 | 4,500 | 240 | 19 | 259—281—247 |
| 104° C _____ | 9.5 | 5,800 | 208 | 25 | 179—230—325 |

The amount of cross-linking developed in irradiated polyethylene beyond the $76\times10^6$ rep. level does not lend itself easily to subsequent working. It is, therefore, desirable to confine calendering and compression molding procedures to polyethylene which has been irradiated at dosage levels not over $76\times10^6$ rep.

It is also possible to mold the hot stretched and previously irradiated polyethylene by the above procedures which, of course, is an advantage of the present invention. The use of a second irradiation step after the stretching has the advantage that, it is no longer necessary to maintain the polyethylene under externally applied tension in those cases where shrinkage is not desired and the clamps, for example, used in some of the examples, can be removed as the clarity has become further fixed against subsequent physical changes.

The desired shaping, for example, can be carried out at the original transition temperature of the polyethylene which, of course, is below the melting point of the irradiated product, without loss of clarity. With a treatment of $50\times10^6$ rep. or above, e.g., $100\times10^6$ rep., pressure and vacuum postforming of the polyethylene sheets is still practical as with other types of thermosetting resins.

A dosage of about $20\times10^6$ rep. has been found to be preferred in many instances since, with this dosage, a product is obtained which has excellent clarity and can also be subsequently readily molded.

The polyethylene treated by irradiation can have a thickness of 3 mils or less, e.g., 1 mil, up to 100 mils, or even higher, e.g., 250 mils, and is preferably about 25 to 125 mils. For thicknesses above 250 mils, the voltage should be above 2,000,000.

Ozone has an adverse effect upon polyethylene. Consequently, it is frequently desirable to have good ventilation or to carry out the irradiation while the polymer is in an atmosphere of inert gas, such as nitrogen or argon. Thus, the irradiation process of Example II can be carried out while continuously passing a stream of argon over the polyethylene.

It is also sometimes desirable to carry out the irradiation while the polyethylene is maintained in a vacuum, e.g., 1 mm. or less. Thus, the irradiation in Example II can be carried out while the polyethylene is in a vacuum of 0.1 mm. total pressure.

While the present application incorporates the entire disclosure of parent application, Serial No. 516,236, filed June 17, 1955, now Patent No. 2,877,500, it is to be understood that the invention to which the claims of the present application are directed is the novel irradiated biaxially oriented polyethylene, more particularly, biaxially oriented polyethylene having a high shrink energy at elevated temperatures and also having unusual clarity.

We claim:

1. Irradiated, biaxially oriented polyethylene stretched at least 100% in each direction and below the break limit.

2. Irradiated, biaxially oriented polyethylene, stretched at least 100% in each direction and below the break limit, having a tensile strength of at least 4000 p.s.i. at 21° C. and a shrink energy of at least 100 p.s.i. at 96° C. in both directions.

3. Irradiated, biaxially oriented polyethylene, stretched at least 100% in each direction and below the break limit, having a tensile strength of at least 5000 p.s.i. at 21° C., a shrink energy of at least 100 p.s.i. at 96° C. in both directions and a percent shrink at 96° C. of at least about 20.

4. Clear, irradiated, biaxially oriented polyethylene stretched at least 100% in each direction and below the break limit.

5. A container made of the biaxially oriented irradiated polyethylene of claim 4.

6. A package comprising food wrapped in the biaxially oriented, irradiated polyethylene of claim 4.

7. A closure made of the biaxially oriented polyethylene of claim 4.

8. A flexible bag made of the biaxially oriented polyethylene of claim 4.

9. Cross-linked biaxially oriented polyethylene, stretched at least 100% in each direction and below the break limit, having a tensile strength of at least 4000 p.s.i. at 21° C. and a shrink energy of at least 100 p.s.i. at 96° C. in both directions.

10. Cross-linked biaxially oriented polyethylene having a tensile strength of at least 5000 p.s.i. at 21° C., a shrink energy of at least 100 p.s.i. at 96° C. in both directions and a percent shrink at 96° C. of at least about 20.

11. Clear, irradiated, biaxially oriented polyethylene, stretched at least 100% in each direction and below the break limit, having a percent shrink at 96° C. of at least about 20.

References Cited in the file of this patent

UNITED STATES PATENTS

| | | |
|---|---|---|
| 2,763,609 | Lewis et al. | Sept. 18, 1956 |
| 2,816,883 | Larchar et al. | Dec. 17, 1957 |
| 2,834,769 | Feller et al. | May 13, 1958 |
| 2,858,259 | Lawton et al. | Oct. 28, 1958 |

FOREIGN PATENTS

| | | |
|---|---|---|
| 204,798 | Australia | Dec. 4, 1956 |
| 739,709 | Great Britain | Nov. 2, 1955 |